United States Patent [19]
Eckert

[11] Patent Number: 5,180,185
[45] Date of Patent: Jan. 19, 1993

[54] DEVICE FOR OBTAINING AN AXLE-LOAD SIGNAL OF A MECHANICALLY SPRING-SUPPORTED DRIVE AXLE OF A LIFTING AXLE STRUCTURE

[75] Inventor: Horst Eckert, Rehburh-Loccum, Fed. Rep. of Germany

[73] Assignee: WABCO Westinghouse Fahrzeugbremsen GmbH, Hanover, Fed. Rep. of Germany

[21] Appl. No.: 758,111

[22] Filed: Sep. 12, 1991

Related U.S. Application Data

[63] Continuation of Ser. No. 540,649, Jun. 19, 1990, abandoned.

[30] Foreign Application Priority Data

Jun. 21, 1989 [DE] Fed. Rep. of Germany ....... 3920287

[51] Int. Cl.⁵ .................... B60G 17/00; B60G 17/02; B60G 25/00
[52] U.S. Cl. .................................. 280/704; 180/24.02; 180/209; 180/290; 267/31; 280/149.1
[58] Field of Search .................. 280/704, 149.1, 678, 280/707, 711, 714, 709, 715; 180/24.02, 290, 24.01, 209; 267/241, 242, 229, 256, 64.11, 64.19, 64.28, 64.23, 31, 32, 25

[56] References Cited

U.S. PATENT DOCUMENTS

| | | | |
|---|---|---|---|
| 3,094,341 | 6/1963 | Alfieri | 267/31 X |
| 3,390,895 | 7/1968 | Verdi | 267/31 X |
| 3,499,663 | 3/1970 | Hedlund et al. | 280/704 |
| 3,870,336 | 3/1975 | Bilas | 280/704 |
| 4,089,544 | 5/1978 | Raidel | 267/31 X |
| 4,573,704 | 3/1986 | VanDenberg et al. | 280/704 |
| 4,705,133 | 11/1987 | Christenson et al. | 280/704 X |
| 4,842,302 | 6/1989 | Lauronen et al. | 180/24.02 |
| 4,854,409 | 8/1989 | Hillebrand et al. | 180/24.02 |
| 4,944,526 | 7/1990 | Eberling | 280/704 |
| 4,993,729 | 2/1991 | Payne | 280/704 X |

FOREIGN PATENT DOCUMENTS

| | | |
|---|---|---|
| 1530709 | 3/1969 | Fed. Rep. of Germany . |
| 2938718 | 4/1981 | Fed. Rep. of Germany . |
| 3525835 | 1/1987 | Fed. Rep. of Germany . |
| 3723493 | 1/1989 | Fed. Rep. of Germany . |

Primary Examiner—Douglas C. Butler
Attorney, Agent, or Firm—Horst M. Kasper

[57] ABSTRACT

The axial load of the mechanically spring-supported drive axle of a lifting axle structure aggregate is defined by the compression of the suspension spring and the pressure of the lifting bellows. A two-dimensional contour of a signal body is employed to engage a signal pin. The signal pin is axially shiftable based on the pressure and rotatable based on the spring support. A two-dimensional contour (20, 21) is disposed at the signal body. The shiftability of the stator (25) of the distance path sensor (24) is provided depending on the pressure of the lifting bellows (1). The pressure-dependent setting of the immersion depth is superposed to the setting of the immersion depth of the signal pin (22) by the contour (20, 21).

11 Claims, 2 Drawing Sheets

DEVICE FOR OBTAINING AN AXLE-LOAD SIGNAL OF A MECHANICALLY SPRING-SUPPORTED DRIVE AXLE OF A LIFTING AXLE STRUCTURE

This is a continuation of the application Ser. No. 07/540,649 filed on Jun. 19, 1990, now abandoned.

BACKGROUND OF THE INVENTION

1. Field of the Invention

The invention relates to a device for obtaining an axle-load signal from a mechanically spring-supported drive axle of a lifting axle structure aggregate, comprising the drive axle and a lifting axle, where the lifting axle can be disconnected by exerting at least one disengagement pressure onto at least one pressure means element.

2. Brief Description of the Background of the Invention Including Prior Art

The lifting axle is lifted from the road surface based on pressure application to a pressure means element with a disengagement pressure or a higher pressure and is thereby disengaged in a lifting axle structure aggregate. In this state, the drive axle operates as a single axle and carries the full axle load. Upon pressure release of the pressure means element, which can occur either by action of the vehicle driver, or automatically, the lifting axle can be lowered onto the road surface and thus can be activated and engaged, and the lifting axle structure aggregate can be used as a double axle while its load capability is increased.

The height level of the disengagement pressure depends, amongst others, on the momentary axle load of the lifting axle structure aggregate and on the construction lay-out and size of the pressure means element. When a lower pressure than the disengagement pressure is exerted onto the pressure means element, the lifting axle accepts, depending on the level of the pressure, a part of the momentary axle load. If only an ambient pressure prevails in the pressure means element, i.e. the the pressure is completely released in the pressure means element, then the axle-load part, accepted by the lifting axle, is determined only according to the lever relationships in the lifting axle structure aggregate. In this state, the lifting axle is fully engaged.

The axle load or, respectively, the axle-load part of the drive axle, upon disengaged or upon engaged lifting axle, respectively, can be described by the path of a defined point of the drive axle relative to the vehicle chassis and by the pressure of the pressure means element. In case of a fully engaged lifting axle, i.e. where ambient pressure prevails in the pressure means element, the axle-load part of the drive axle is proportional to the axle load of the complete lifting axle structure aggregate and thus represents also a measure for the axial load of the complete lifting axle structure aggregate. In case of engagement and disengagement of the lifting axle, i.e. during the lowering and raising of the lifting axle, the defined point of the drive axle performs a jump along a path of its position, which cannot be employed and evaluated for determining the axle load.

A device of the kind initially recited is described in the German Patent Application P 3,840,838.4, not published. A three-dimensional characterizing field is disposed on the surface of the signal body, as described in the German Patent Application P 3,840,838.4. This characterizing field exhibits for each configuration of rotary position and axial position of the signal body a predetermined distance relative to one point of the vehicle chassis. This distance is captured and observed by the sensor of the electrical path sensor, affixed at the vehicle chassis, and the distance is transformed by the path sensor into the axle-load signal. Depending on the path of the defined point of the drive axle relative to the vehicle chassis, based on a spring compression of the drive axle, the signal body is rotated around a rotation axis fixed relative to the vehicle chassis and is axially shifted depending on the pressure of the pressure means element in order to obtain a load-dependent setting of the signal body and thus of the characterizing field.

This conventional structure is expensive based on the required three-dimensional characterizing field on the surface of the signal body.

SUMMARY OF THE INVENTION

1. Purposes of the Invention

It is an object of the present invention to provide a device for obtaining an axle-load signal which can be constructed at low cost.

These and other objects and advantages of the present invention will become evident from the description which follows.

2. Brief Description of the Invention

The present invention provides for an apparatus for obtaining an axle-load signal. A lifting axle structure aggregate includes a mechanically spring-supported drive axle and a pressure means element. The lifting axle is disengageable by pressure application to the pressure-means element with at least one disengagement pressure. A signal body has a jacket face. The signal body is rotatable around a rotation axis depending on the path of one point of the drive axle relative to the vehicle chassis. The rotation axis of the signal body is fixedly disposed relative to the vehicle chassis. The jacket face of the signal body exhibits at least one contour. Said contour defines a predetermined distance variable for each rotation position of the signal body. Said distance variable is disposed substantially perpendicular to the rotation axis of the signal body and measured between a fixed point of the chassis and the contour of the signal body. An electrical distance path sensor includes a stator. The electrical distance path sensor is disposed at the chassis for capturing the distance variable. The stator of the distance path sensor is axially shiftable relative to the fixed point of the chassis depending on the pressure supplied by the pressure means element.

The pressure-means element can be formed by lifting bellows. The shifting of the stator can follow a change of the pressure of the lifting bellows after a time delay. The stator can form part of a piston delimiting a chamber. A pressure of the pressure means element can be exerted onto the chamber. A throttle can be disposed in the feed line of the pressure to the chamber.

A method for obtaining an axle load signal comprises the following steps. Each position change of a point positionally fixed relative to a chassis of a vehicle is transferred to a signal body associated with a lifting axle of the vehicle via a linkage including a lever. The signal body is rotated corresponding to the position of the lever and each path of the point positionally fixed. A sensor probe contacting and following a contour of the signal body is spring-supported thereby capturing a value related to the relative distance between axle and chassis. A pressure of lifting bellows is employed for determining the corresponding position of a stator in relation to a point fixed relative to the chassis. An immersion depth of the sensor probe in the stator is determined depending on the position of the stator in turn dependent on the pressure of the lifting bellows, and on the position of the sensor probe dependent on the rotation angle of the signal body for obtaining a value representing the vehicle load.

The invention can be performed in connection with all suitable pressure means.

The invention itself, however, both as to its construction and its method of operation, together with additional objects and advantages thereof, will be best understood from the following description of a specific embodiment when read in connection with the accompanying drawing.

BRIEF DESCRIPTION OF THE DRAWING

In the accompanying drawing, in which are shown several of the various possible embodiments of the present invention.

The same reference numerals are employed in the drawings for construction elements, performing the same function.

DESCRIPTION OF INVENTION AND PREFERRED EMBODIMENT

Figure 1:
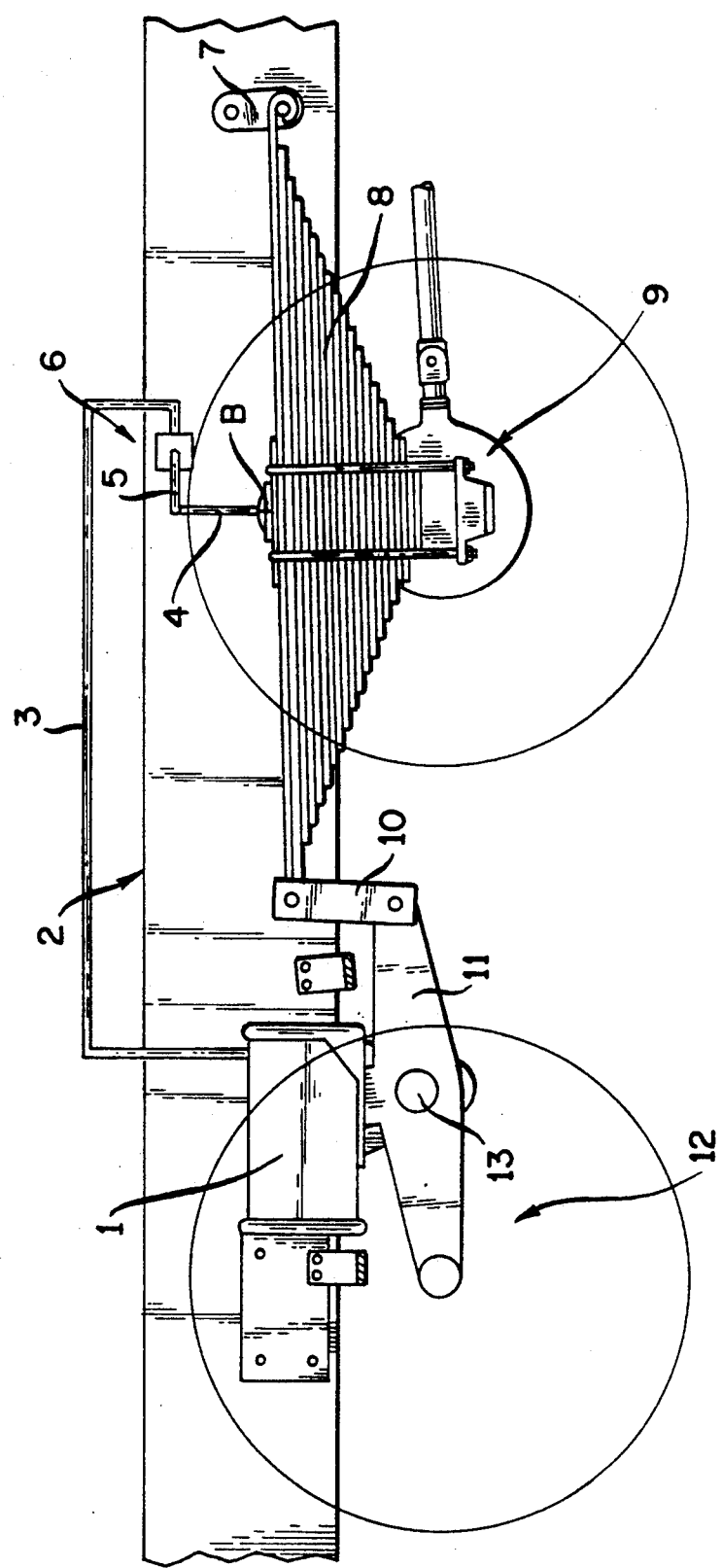
FIG. 1 is a schematic side elevational view of a general arrangement of a lifting axle structure aggregate with a device for obtaining an axle-load signal from the drive axle of the lifting axle structure aggregate.

According to the invention, there is provided for an apparatus for obtaining an axle-load signal from a mechanically spring-supported drive axle 9 of a lifting axle structure aggregate. A lifting axle 12 is disengageable by pressure application to at least one pressure-means element with at least one disengagement pressure. A signal body 31, 33 is rotatable, depending on the path of one point B of the drive axle 9 relative to the vehicle chassis 2, around a rotation axis M fixedly disposed at the vehicle chassis 2. A jacket face of the signal body 31, 33 exhibits at least one contour 20, 21, which assumes for each rotation position of the signal body 31, 33 a predetermined distance x, disposed substantially cross to the rotation axis M of a point C of the vehicle chassis 2. The apparatus includes an electrical distance path sensor 24 capturing the distance x. The stator 25 of the distance path sensor 24 is axially shiftable depending on the pressure of the pressure means element, formed by the lifting bellows 1, relative to the point C.

The pressure-means element is can be formed by lifting bellows 1. The shifting of the stator 25 during a change of the pressure of the pressure means element, formed by the lifting bellows 1, can follow this change after a time delay. The stator 25 forms part of a piston 25, 28, delimiting a chamber 26. A pressure of the pressure means element, formed by the lifting bellows 1, can be exerted onto the chamber 26.

A throttle 27 can be disposed in the feed line of the pressure to the chamber 26.

FIG. 1 shows partially a vehicle chassis, generally designated with the reference numeral 2, which comprises in a conventional way a vehicle frame as well as body parts and mounting parts. A lifting axle structure aggregate is suspended at the vehicle chassis 2 via at least one mechanical spring element, suspension and connection means 7, 10, 13, at least one double lever 11, and at least one pressure means element. The mechanical spring element is formed as a leaf spring 8 and is referred to in the following under such designation. The pressure-means element is formed as a lifting bellows 1 and is referred to as such in the following. A lifting bellows is usually employed where the pressure means is gaseous and, in particular, is represented by air. However, it is similarly conventional to employ piston cylinders as pressure means element and this is done, in particular, in case of employment of a hydraulic pressure means. In addition, other construction types are usual relating to the mechanical spring element.

The lifting axle structure aggregate comprises a drive axle 9, mechanically spring-supported by the leaf spring 8, and a lifting axle 12. The lifting axle 12 is represented as a trailing lifting axle or as a dolly lifting axle or as a lifting dummy axle, but can also be disposed in a conventional way as a leading lifting axle.

The mode of operation of such a lifting axle structure aggregate is illustrated in detail in the section "Background of the Invention." For purposes of completion, it is added that the lever relations, recited in the section "Background of the Invention," result from the lever length of the double lever 11 and of the length of the leaf spring 8.

FIG. 1 illustrates in addition the general arrangement of a device 6 for obtaining an axle-load signal from the drive axle 9. The path of a point B of the drive axle 9 about in the direction of the axle load, i.e. about perpendicular to the road surface, and relative to the vehicle chassis 2, i.e. the spring compression of the drive axle 9, is transferred to the drive axle 9 via a linkage 4 and a lever 5. For purposes of simplicity and clarity, the point B is illustrated at a region of the leaf spring 8, which region is solidly and rigidly connected to the drive axle 9. The point B can however alternatively also be provided at different suitable regions of the drive axle 9 or of the leaf spring 8.

In addition, the pressure prevailing in the lifting bellows 1 is fed to the device 6 via a pressure means conduit line 3.

Figure 2:
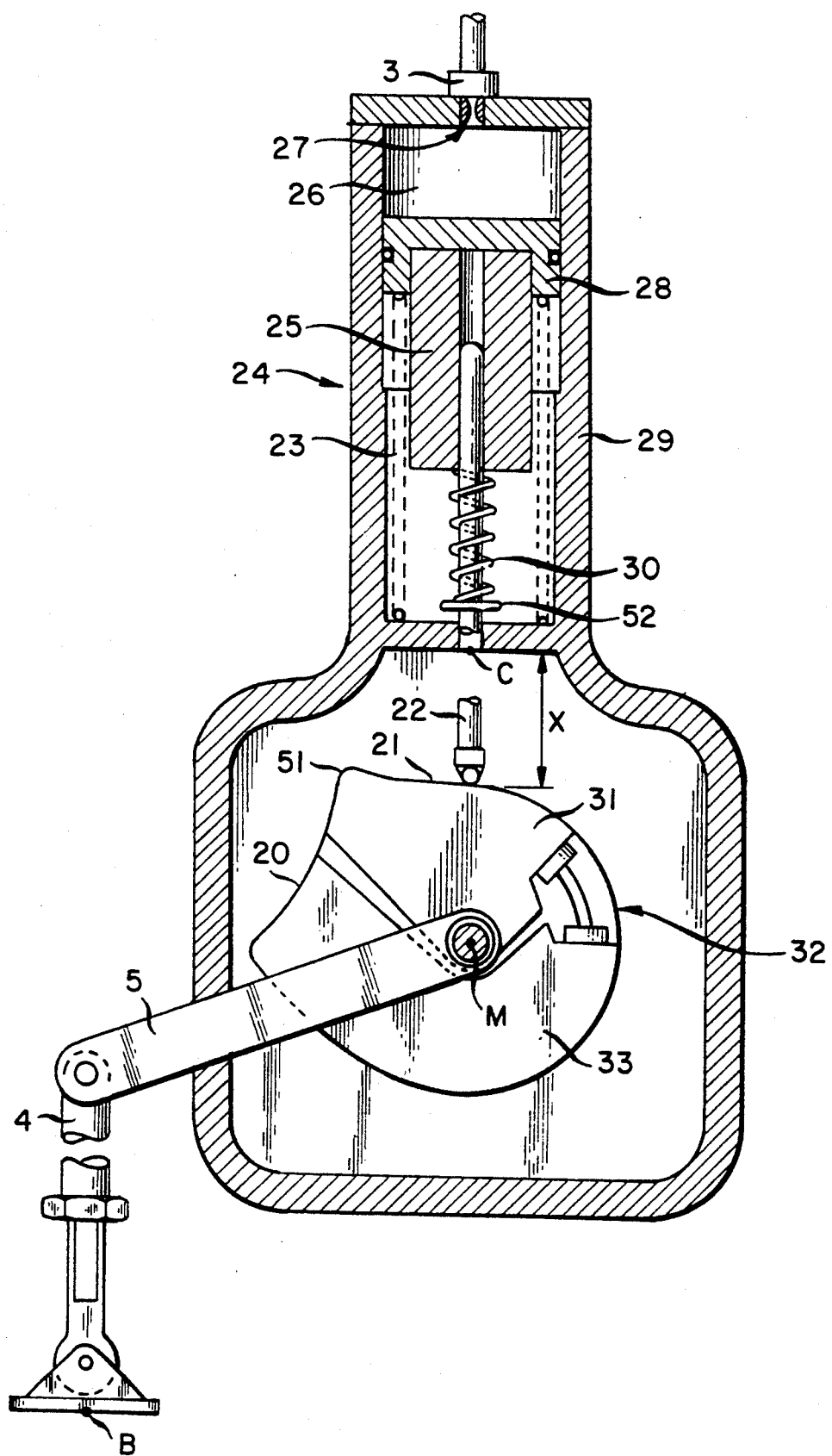
FIG. 2 is a partially sectional view of the structure for obtaining the axle-load signal.

FIG. 2 illustrates details of the device 6. A signal body 31, 33 is rotatably supported around a rotation axis M in a casing 29. In general, a signal body is a mechanical structure suitable to generate a signal, where the signal value depends on the angle of rotation of the signal body around a rotation axis. The rotation axis M is referred to in the following with the reference mark M indicating the intersection point of the axis M with the plane of the drawing. The casing 29 is attached at the vehicle frame such that the casing 29 itself forms a component of the vehicle chassis 2. A point C is defined in the casing 29 and thus at the vehicle chassis 2. The point C can be disposed arbitrarily within the limits set by its functions described further below. For example, the point C can be disposed on the rotation axis M.

The jacket face of the signal body 31, 33 exhibits a contour 20, 21, representing a cam, which contour 20, 21 assumes for each rotation position of the signal body 31, 33, a predetermined distance x substantially cross to the rotation axis M from the point C. The contour 20, 21 can be formed planar or linear at the signal body 31, 33. The contour 20, 21 is preferably formed as a cam structure.

The lever 5 engages at the signal body 31, 33. The lever 5 is connected to the linkage 4 at the free end of the lever 5. In this way, the path under consideration of the point B of the drive axle 9 is transformed into a rotation angle of the signal body 31, 33.

The contour 20, 21 comprises two sections 20 and 21, respectively. The contour section 21 determines the distance x in case of a disengaged lifting axle 12, and the second contour section 20 determines the distance x in case of an engaged lifting axle 12. The distance x is defined as the distance between the contact point of the contour 20, 21 and a defined level of the casing 29, said level being disposed between the signal body 33 and the chamber 26 or the throttle 27. In case of an engaged lifting axle according to FIG. 2, the distance x is substantially variable with the angle assumed by the signal body 31, 33 based on swivelling around axis M. Between these two sections, the contour 20, 21 comprises a neutral region, designated by way of example as 51, which corresponds to the path jump during engagement and disengagement of the lifting axle 12. The course of the contour 20, 21 is determined in the contour section 21 by the spring characteristic of the leaf spring 8 and in the contour section 20 by the spring characteristic of the combination of the leaf spring 8 and of the lifting bellows 1.

In addition, an electrical distance path sensor, generally designated as reference numeral 24, captures the distance x and belongs to the device. This distance path sensor can be of any desired construction kind. According to the embodiment illustrated, the distance path sensor 24 comprises in a conventional way a stator 25 and a sensor probe 22 immersing and plunging into the stator 25. The sensor probe 22 is pretensioned against the signal body 31, 33. The signal delivered by the distance path sensor 24 is determined by the immersion depth of the sensor probe 22 into the stator 25.

The stator 25 is axially shiftable depending on the pressure of the lifting bellows 1. The immersion depth of the sensor probe 22 in the stator 25, and thus the signal delivered by the distance path sensor 24, therefore depends also on the pressure of the lifting bellows 1 in addition to the distance x.

The mode of operation of the invention structure is as follows.

Each path of the point B solidly connected to the drive axle and of the kind under consideration is transferred to the signal body 31, 33 via the linkage 4 and the lever 5 and each path of the point B rotates the signal body 31, 33 correspondingly. The sensor probe 22 thereby follows the contour 20, 21, thereby capturing the distance x. The pressure of the lifting bellows 1 determines the corresponding position of the stator 25 in relation to the point C. An immersion depth of the sensor probe 22 into the stator 25 results from the position of the stator 25, dependent on the pressure of the lifting bellows 1, and from the shifting of the sensor probe 22, dependent on the distance x. Said immersion depth of the sensor probe 22 into the stator 25 determines the axle load or the axle-load part, respectively, of the drive axle 9, depending on the operation state of the lifting axle, and thus provides the axle-load signal to be obtained. As noted above, this corresponds also to the axle load of the complete lifting axle structure aggregate in case of a fully engaged lifting axle.

Several constructive details of the illustrated structure are described in the following.

The recited pretensioning of the sensor probe 22 versus the signal body 31, 33 is performed via a spring 30, supported, on the one hand, at the sensor probe 22 via support stopper 52 and, on the other hand, at the stator 25. However, the recited pretensioning of the sensor probe 22 can be performed with any other suitable means.

The stator 25 is part of a piston 25, 28, which delimits a chamber 26. The outer piston part 28 defines one wall side of the chamber 26 and covers part of the circumference of the piston 25. The pressure of the lifting bellows 1 is fed to the chamber 26 via the pressure means conduit line 3. The piston 25, 28 is pretensioned by a spring 23 against the pressure in the chamber. As long as ambient pressure prevails in the lifting bellows 1 and in the chamber 26, i.e. the lifting axle 12 is fully engaged and used, the spring 23 maintains the piston 25, 28 in the position of the lowest volume of the chamber 26. The piston 25, 28 is increasingly shifted from this position with increasing pressure of the lifting bellows 1 in the chamber 26, wherein the immersion depth of the sensor probe 22 into the stator 25 increases correspondingly.

The spring 23 is formed such or can be adjusted such that the pressure-dependent shifting of the piston 25, 28, and thus of the stator 25, is delimited and stopped at a casing detent or stop or by a blocking of the spring 23 in a fashion not described in detail.

The distance path sensor 24, the spring 23, the piston part 28, and the chamber 26 are disposed in the same casing 29 as the signal body 31, 33. They can, however, also be constructed as a separate device unit with its own casing.

A further embodiment of the invention structure exhibits in the pressure-means conduit line 3 a throttle 27. This throttle 27 delays the shifting of the stator 25 versus a change of the pressure in the lifting bellows 1 and thus prevents that each pressure peak in the lifting bellows 1, caused by the road surface, passes into the chamber 26 and thus onto the immersion depth of the sensor probe 22 in the stator 25 as well as onto the axle-load signal.

A different embodiment comprises that the signal body 31, 33 is made up, in a way not illustrated, of two parts 31 and 33 with each having a contour section 21 or 20, respectively, of the contour 20, 21. The position of contour sections 20, 21 to each other is adjusted by a schematically indicated adjustment device 32 for balancing the structure and assembly tolerances as well as the tolerances of the spring characteristics of the leaf spring 8 and of the lifting bellows 1. The signal body can be constructed as a single part in a way not described here in detail under renunciation of the possibility of employing a two-part construction.

The electric axle-load signal, generated by the device 6 can be evaluated in any suitable manner. For example, consideration can be given in this connection to an automatic load-sensing valve, traction control, initial drive start aid, drive-axle overload protection, and the like.

In this context, the term "drive-axle overload protection" means that the lifting axle 12 is automatically put into an engagement position by way of a suitable control device, if the drive axle 9 is loaded up to the maximum permissible value. In case of a "traction control," the pressure in the lifting bellows 1 is controlled via a suitable control device such that the once reached permissible axle load of the drive axle 9 is automatically controlled. This ensures that the largest possible advance drive force is always transferred by the drive axle 9 onto the road surface. The "initial drive start aid" refers to a short-term control of the pressure in the lifting bellows 1 by a suitable control device such that the drive axle 9 is also overloaded for a short time. Thereby, the advance drive force, transferrable from the drive axle 9 onto the road surface, is increased for a short time. This is an advantage in particular during the initial drive start on a road surface with a low frictional engagement.

It is obvious that several of the mentioned possibilities for the evaluation of the axle-load signal can be employed simultaneously. In this case, possibly several devices of the described kind can be furnished simultaneously, for example, in parallel or staggered according to an angle with separating casings or with joint casings.

A person of ordinary skill in the art will also recognize that the invention elements disposed in the exemplified embodiment or, respectively, at the casing 29, can also be disposed without a joint casing as long as they meet only the conditions essential for the invention, for example, the elements of the vehicle top box or, respectively, the drive axle or, respectively, the lifting axle structure aggregate.

It will be understood that each of the elements described above, or two or more together, may also find a useful application in other types of devices for obtaining a signal differing from the types described above.

While the invention has been illustrated and described as embodied in the context of a device for obtaining an axle-load signal for a mechanically spring-supported drive axle of a lifting axle structure aggregate, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An apparatus for obtaining an axle-load signal from a mechanically spring-supported drive axle of a lifting axle structure aggregate comprising said drive axle and a lifting axle supported by at least one pressure-means element, said lifting axle being disengageable by application of a pressure of at least a level of a disengagement pressure to said at least one pressure-means element, comprising
   (a) a signal body which is rotatable, depending on the path of a first point of the drive axle relative to a vehicle chassis, around a rotation axis fixedly disposed at the vehicle chassis;
   (b) a jacket face of the signal body exhibits at least one contour which assumes for each rotation position of the signal body a predetermined distance, disposed substantially perpendicular to the rotation axis relative to a second point of the vehicle chassis;
   (c) wherein the apparatus includes an electrical distance path sensor comprising a stator for capturing the predetermined distance,
wherein the stator of the distance path sensor is axially movable relative to said second point of the vehicle chassis depending on the pressure of the pressure means element.

2. The apparatus according to claim 1, wherein the pressure-means element is formed by at least one lifting bellows.

3. The apparatus according to claim 1, wherein upon a change of the pressure of the pressure-means element a corresponding movement of the stator follows with a time delay to this change.

4. The apparatus according to claim 1, wherein the stator forms part of a piston, delimiting a chamber, wherein said pressure of the pressure-means element is exerted onto the chamber.

5. The apparatus according to claim 4, wherein a throttle (27) is disposed in a feed line of said pressure to the chamber.

6. A method for obtaining an axle load signal comprising
   attaching a rotatable signal body having a contoured outer jacket face to a vehicle chassis;
   rotating the signal body with a linkage including a lever attached to the signal body and hinged to a drive axle and by a rotation angle corresponding to a position of the lever and to a vertical relative position of the drive axle relative to the vehicle chassis;
   spring supporting a distance sensor probe contacting and following a contour of the signal body thereby capturing a value related to a relative height level distance between drive axle and vehicle chassis;
   applying a pressure of a pressure means element supporting a lift axle on the vehicle chassis for pressing against a piston supporting a stator for establishing a position of the stator defined by the pressure of the pressure means element;
   measuring an immersion depth of the distance sensor probe in the stator depending on an angle of the signal body and depending on the position of the stator for obtaining an axle load signal.

7. In a vehicle having a vehicle chassis and a lifting axle structure,
   said lifting axle structure comprising a drive axle and a lifting axle,
   said drive axle being mechanically spring-supported by said vehicle chassis and said lifting axle being supported by said vehicle chassis via at least one pressure-means element,
   said lifting axle being disengageable by application of a pressure of at least a level of a disengagement pressure to said at least one pressure means element,
   an apparatus for obtaining an axle-load signal from said drive axle, comprising
   (a) a signal body which is rotatable, depending on a path of a point of the drive axle relative to said vehicle chassis, around a rotation axis fixed at said vehicle chassis;
   (b) said signal body having a jacket face which exhibits at least one contour, which assumes for each rotation position of the signal body a predetermined distance from a point of said vehicle chassis, said distance being substantially disposed cross to said rotation axis;
   (c) an electrical distance path sensor for capturing the distance;
   (d) said electrical distance path sensor comprising a stator which is movable relative to said point of said vehicle chassis depending on the pressure of the pressure means element.

8. The apparatus according to claim 7, wherein said pressure means element is formed by at least one lifting bellows.

9. The apparatus according to claim 7, wherein a shifting of the stator during a change of the pressure of the pressure means element follows this change after a time delay.

10. The apparatus according to claim 7, wherein the stator forms part of a piston, delimiting a chamber, wherein a pressure of the pressure means element, formed by the lifting bellows, is exerted onto the chamber.

11. The apparatus according to claim 10, wherein a throttle is disposed in a feed line of the pressure to the chamber.

* * * * *